Figure 1:
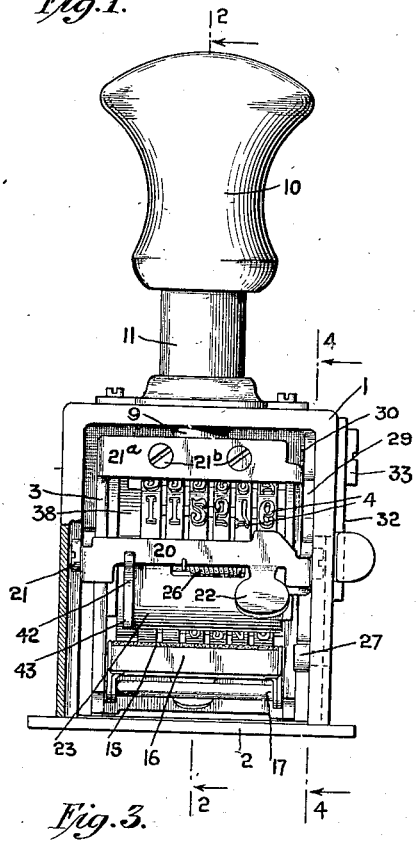
Figure 2:
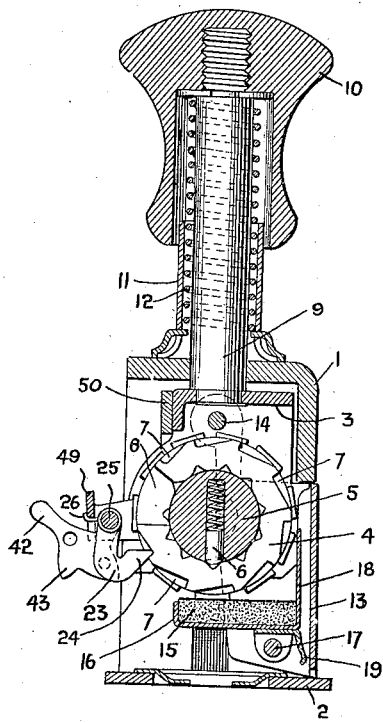
Figure 3:
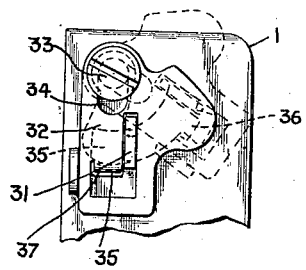
Figure 4:
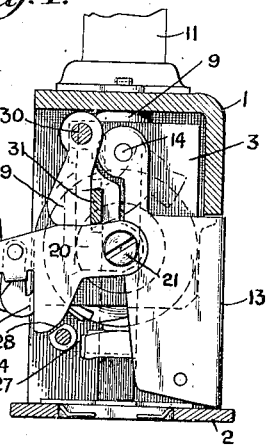
Figure 5:
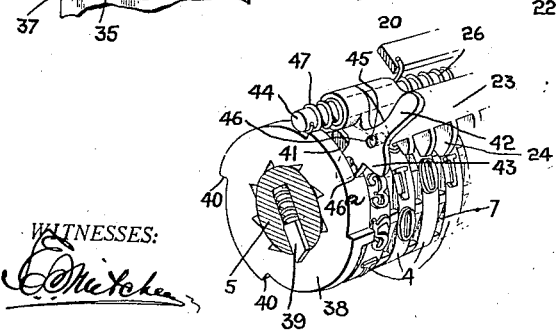

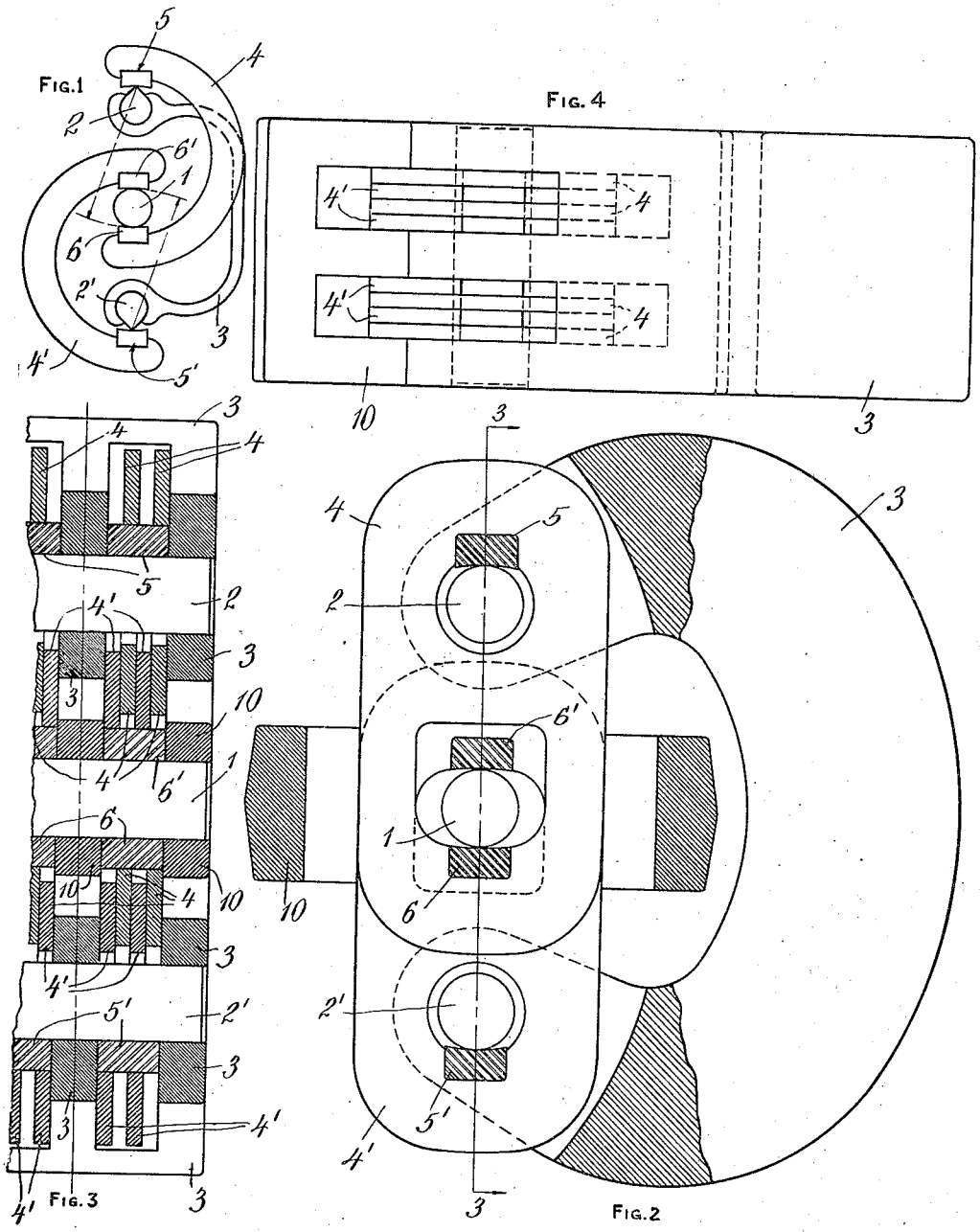

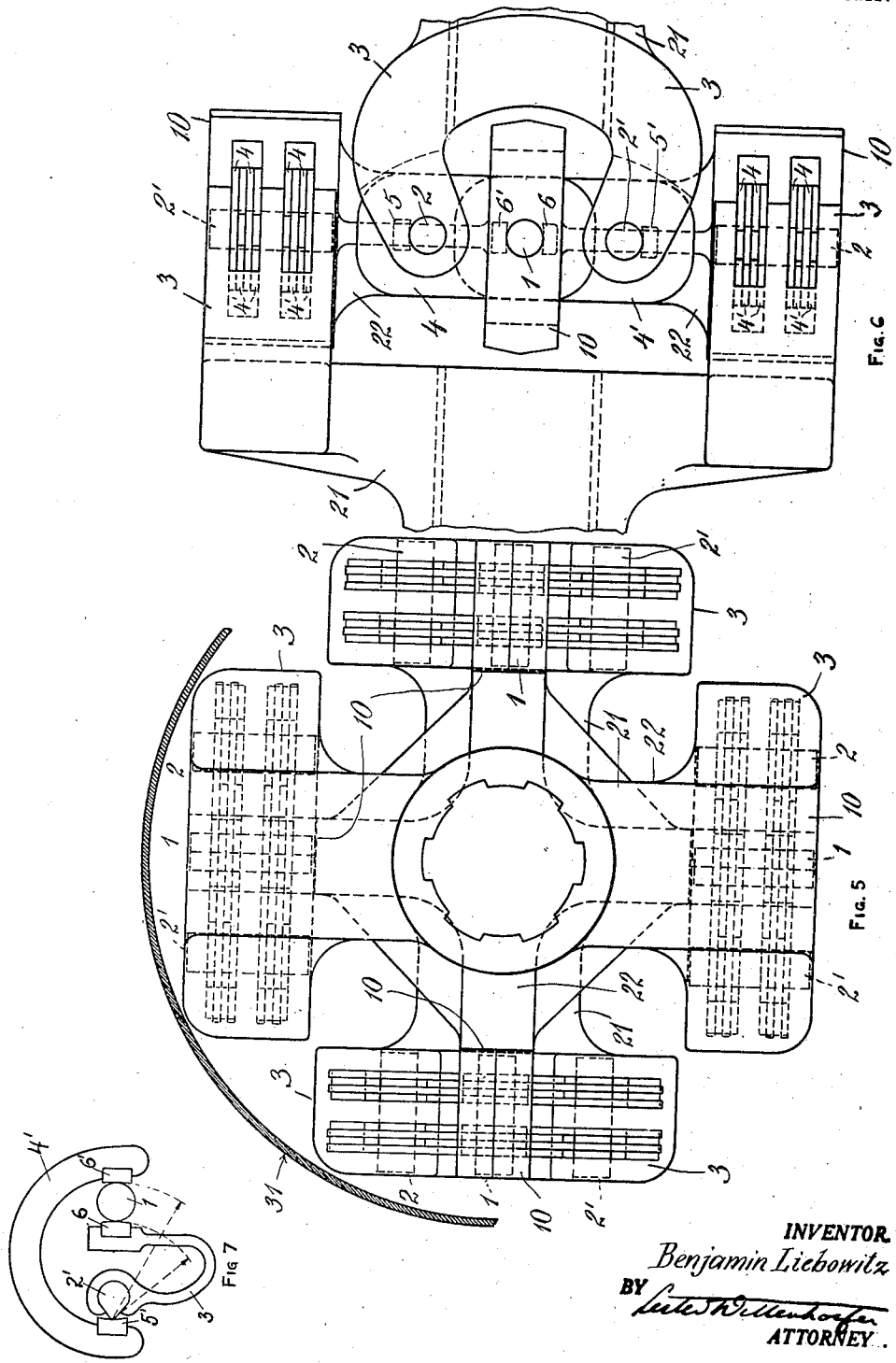

A. MARKS.
NUMBERING STAMP AND THE LIKE.
APPLICATION FILED JUNE 12, 1918.

1,335,746.

Patented Apr. 6, 1920.
2 SHEETS—SHEET 1.

WITNESSES:

INVENTOR.
Albert Marks
BY
ATTORNEYS stantially equal to the distance between said bearing and the points of rocker-pin contact; the initial strain on the connecting member being such as to produce a tension in the links greater than one-half of the maximum load to be carried by the pivot.

3. In a universal joint, the combination with a pair of forks and a cross terminating in gudgeons, of means for pivotally connecting the gudgeons with the forks, comprising a yoke member at each end of each fork extending substantially at right angles to the plane of the fork and straddling the companion gudgeon, a pair of rocker-pins carried by each yoke member, and links connecting each pair of rocker-pins with its companion gudgeon, said links being subjected to an initial tension greater than one-half of the maximum load to be transmitted.

4. In a pivot for transmitting load in opposite directions, the combination of a gudgeon, a rocker-pin, and a linkage connecting said elements, said linkage being subjected to an initial stress greater than one-half of the maximum load to be transmitted.

5. In a pivot for transmitting load in opposite directions, the combination of a gudgeon disposed between two arcuated bearings, the curvature of said bearings being such as to maintain the gudgeon in substantial neutral equilibrium throughout its range of motion, a rocker-pin, and means for maintaining both the gudgeon and the rocker-pin in contact with their bearings under a pressure greater than one-half of the maximum load to be transmitted.

6. In a device for transmitting load in opposite directions, the combination of a rocker pin, a seat therefor, and means having rolling motion and operative to maintain the pin in contact with its seat under a pressure greater than one-half of the maximum load to be transmitted.

BENJAMIN LIEBOWITZ.